(12) United States Patent
Reagan et al.

(10) Patent No.: US 7,360,740 B2
(45) Date of Patent: Apr. 22, 2008

(54) TELESCOPIC CARPET CONVEYOR

(76) Inventors: Scott A. Reagan, 7712 Old Rutledge Pike, Knoxville, TN (US) 37924; Barney T. Giddens, 409 Elkmont Rd., Knoxville, TN (US) 37922

( * ) Notice: Subject to any disclaimer, the term of this patent is extended or adjusted under 35 U.S.C. 154(b) by 290 days.

(21) Appl. No.: 11/176,065

(22) Filed: Jul. 7, 2005

(65) Prior Publication Data

US 2006/0231670 A1    Oct. 19, 2006

Related U.S. Application Data

(60) Provisional application No. 60/665,501, filed on Mar. 25, 2005.

(51) Int. Cl.
*B65H 16/06*    (2006.01)
(52) U.S. Cl. ............... 242/596.1; 242/596.4; 414/911
(58) Field of Classification Search ......... 242/578, 242/596, 596.1, 596.4, 596.8; 414/911
See application file for complete search history.

(56) References Cited

U.S. PATENT DOCUMENTS

| | | | |
|---|---|---|---|
| 3,718,299 A * | 2/1973 | Osgood | 242/559.1 |
| 3,971,484 A | 7/1976 | Anderson et al. | |
| 4,295,777 A | 10/1981 | Bell et al. | |
| 4,321,004 A | 3/1982 | Mills | |
| 4,396,166 A | 8/1983 | Kollman | |
| 4,618,308 A | 10/1986 | Ballard | |
| 4,693,433 A * | 9/1987 | Martin | 242/559.1 |
| 4,743,157 A * | 5/1988 | Takatsuki | 414/498 |
| 4,824,313 A | 4/1989 | Miller | |
| 5,320,296 A * | 6/1994 | Ozcariz et al. | 242/559.4 |
| 6,210,095 B1 | 4/2001 | Hempel et al. | |
| 6,390,759 B1 * | 5/2002 | Novak et al. | 414/430 |

* cited by examiner

*Primary Examiner*—Peter M. Cuomo
*Assistant Examiner*—Sang Kim
(74) *Attorney, Agent, or Firm*—Pitts & Brittian, P.C.

(57) ABSTRACT

Apparatus for storing and dispensing portions from a bulk roll of carpet. The apparatus is portably mounted in a vehicle or the like and telescopically extends from the vehicle in position for the dispensing measured portions of the carpet from the roll, following which the apparatus is telescopically returnable to the vehicle for storage, transport or the like.

16 Claims, 8 Drawing Sheets

TELESCOPIC CARPET CONVEYOR

CROSS-REFERENCE TO RELATED APPLICATIONS

This Application claims the benefit of U.S. Provisional Application No. 60/665,501, filed Mar. 25, 2005.

STATEMENT REGARDING FEDERALLY SPONSORED RESEARCH OR DEVELOPMENT

Not Applicable

FIELD OF INVENTION

This invention relates to apparatus and methods-for dispensing a large roll of carpet (known in the art as "bulk roll") in manageable portions suitable for covering a given area of flooring.

BACKGROUND OF THE INVENTION

Commonly in the art, carpet floor covering is purchased in bulk rolls, each of which individually weighs more than that weight which is reasonably manually manipulated. Such bulk rolls most commonly require a forklift or other mechanical apparatus for moving the roll into and out of storage. The advantage of a forklift is not commonly available at a job site where the bulk carpet is to be divided into portions, each of a size suitable for application of the carpet onto a given area for flooring.

Bulk carpet commonly is available in twelve foot widths. The amount of carpet (length) in a roll may vary widely. It is not uncommon for a bulk roll of carpet to weigh several hundred pounds. Movement of a roll of this nature from storage and transport of the same to a job site almost universally requires some type of mechanical lift, such as a forklift for moving the roll from storage and only a truck, van or the like for transport to the job site. Transporting of a forklift, for example, to a job site is not practical, however, thereby creating a problem for an installer when reaching the job site.

At a job site, the carpet installer must divide the twelve foot wide carpet into individual portions, each having a length which is suitable for covering a given area of flooring. For example, for covering a 12×12 foot floor area, the installer will need to unwind 12 linear feet of the carpet from the roll, etc. In most instances, multiple withdrawal of individual portions of the bulk roll will be made with respect to a given job site.

BRIEF SUMMARY OF THE INVENTION

In accordance with the present invention there is provided an apparatus which is itself mounted in a vehicle such as a truck, van or the like, hence is portable, and which may be loaded with a bulk roll of carpet from storage, for example, transported to a job site, and which is extensible, at the job site, from its original stored length within the vehicle to a "working" length external of the vehicle.

Multiple sets of rails mounted mutually telescopically with respect to one another carry demountable structure for receiving a bulk roll of carpet, for storage of the bulk roll during transport to a job site, for measuring off a desired length of carpet from the roll, and for retaining the remainder of the roll stored for future use, if needed. Manual manipulation of the bulk roll itself for reasons other that unrolling desired portions thereof, are effectively eliminated, thereby allowing one or two persons to easily and readily withdraw desired portions of the length of the carpet from the bulk roll. Such portions are readily manually moved from the present apparatus to the location where they are to be laid over a given area of flooring.

In one embodiment, demountable structural components are provided for various subassemblies of the apparatus of the present invention.

DETAILED DESCRIPTION OF THE INVENTION

Figure 1:
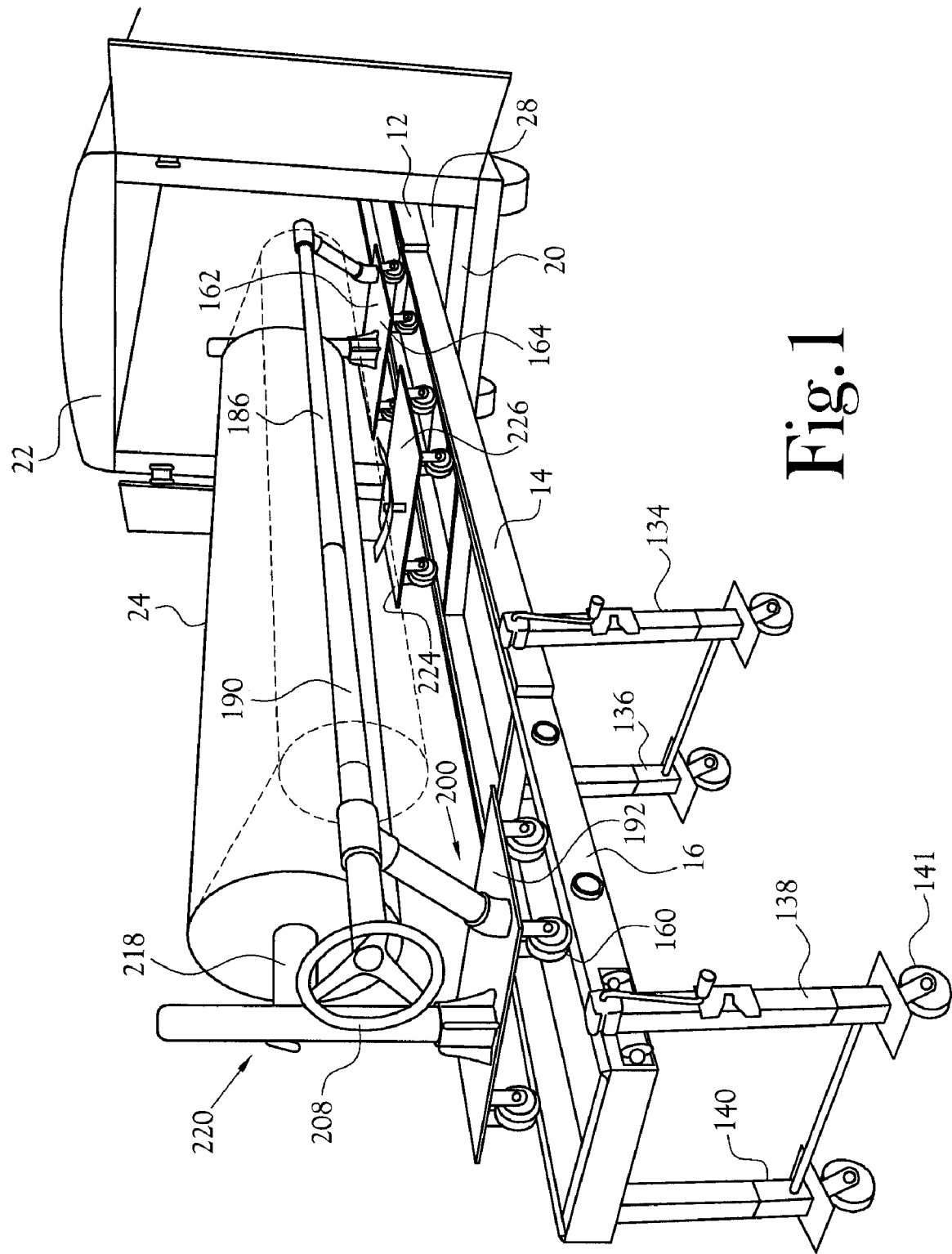
FIG. 1 is a representation of an apparatus embodying various of the features of the present invention associated with a vehicle and showing the apparatus in its extended attitude and with a bulk roll of carpet mounted thereon.
Figure 2:
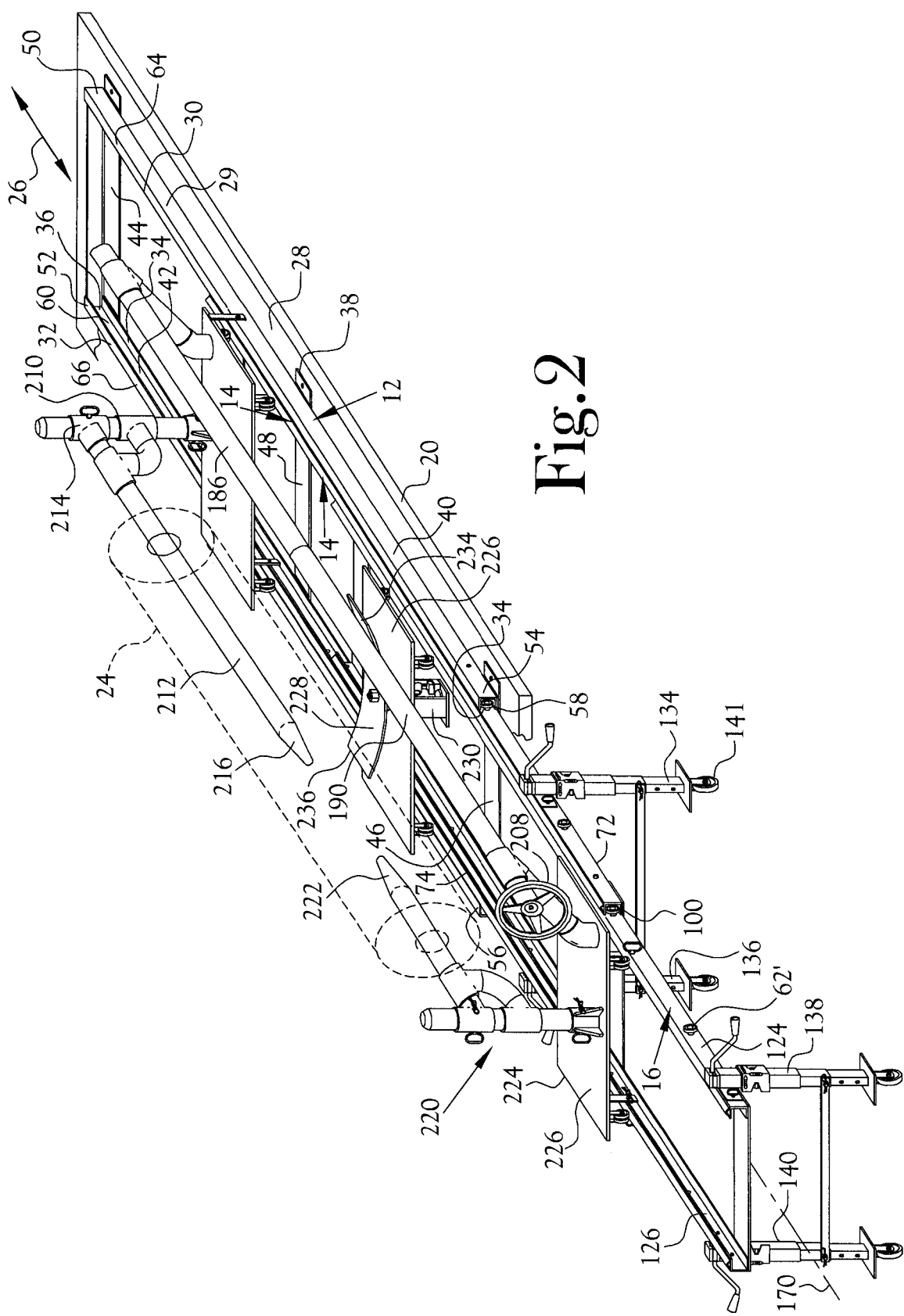
FIG. 2 is perspective view of triple rail sets of an apparatus of the present invention telescopically extended and showing a bulk roll of carpet in phantom.

With initial reference to FIGS. 1 and 2, in one embodiment, the present invention includes at least two, and preferably, first, second and third telescoping rail sets 12, 14 and 16, respectively, the first rail set 12 being fixedly mounted in the bed 16 of a vehicle 22 of a size suitable to receive and enclose a bulk roll of carpet 24 of the common twelve foot width, or a bulk roll of greater or lesser width carpet. The vehicle employed may be of any suitable type, such as a truck, van or trailer. Preferably, the vehicle is enclosed to provide protection for the carpet from the elements. For purposes of economy of space utilization, the vehicle preferably is of a rectangular floor plan, with the length of the floor running parallel to the intended direction of travel 26 of the vehicle.

In the depicted embodiment the apparatus includes a first rail set 12 which is designed to be rigidly affixed to the floor 28 of the vehicle in which the apparatus is housed. The apparatus further includes a second rail set 14 which is telescopically mounted in the first rail set. To this end, the first and second rails 29 and 31, respectively, of the first rail set are each in the form of first and second "C" channels 30, 32, preferably of a metal, the openings 34, 36 of which face one another across the width of the rail set. Side brackets 38 (typical) are affixed to the outside web 40, 42 of each "C" channel and provide means by which each of the first and second "C" channels of the first rail set may be bolted, or otherwise fixedly attached, to the floor of the vehicle. In the depicted embodiment, there are provided cross member braces 44, 46 and 48 extending between each of the respective opposite ends 50, 52 of the first and second "C" channels and approximately midway between such opposite ends which provide rigidity to the rail set and which aid in ensuring the required constant lateral spacing between the first and second rails of the set. Importantly, the first and second "C" channels of the first rail set are coplanar, extend parallel with one another and are plumb with respect to one another. In one example, the first and second "C" channels of the first rail set are spaced apart from one another by a distance of thirty-six inches outside to outside. No roller bearings are provided on the first rail set. Rather, each of the "C" channels is adapted to define a bearing raceway 58, 60, respectively, for roller bearings 62 (typical) associated with a second rail set 14 which are received within such "C" channels. To expedite the receipt of such roller bearings therein, the top leg 64, 66 of each of the "C" channels is about one inch less in width than the bottom leg of such channel.

In a typical example, each of the rails of the first rail set are about ten feet in length.

Figure 3:
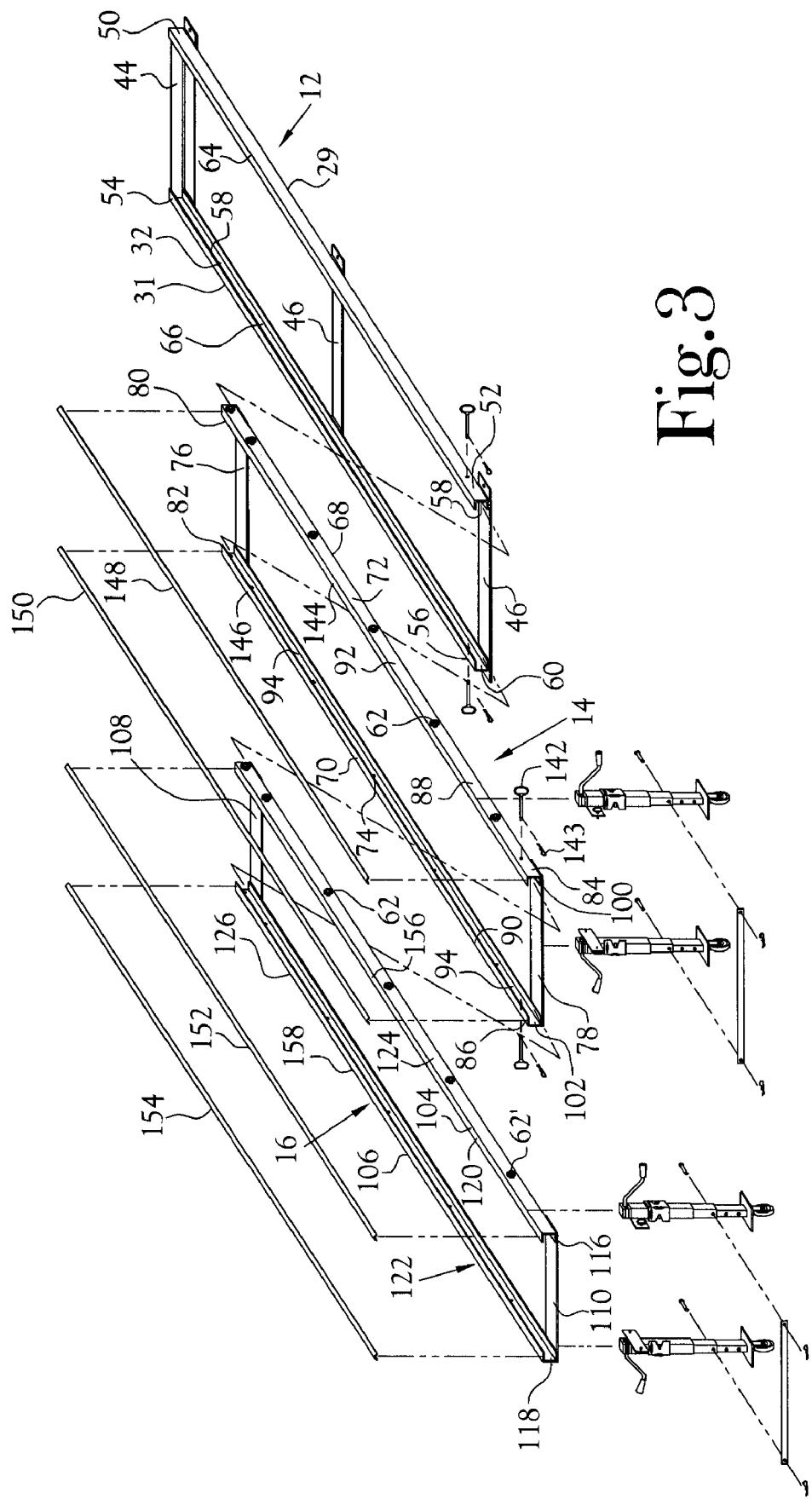
FIG. 3 is an exploded view of the triple rail sets depicted in FIG. 2.
Figure 4:
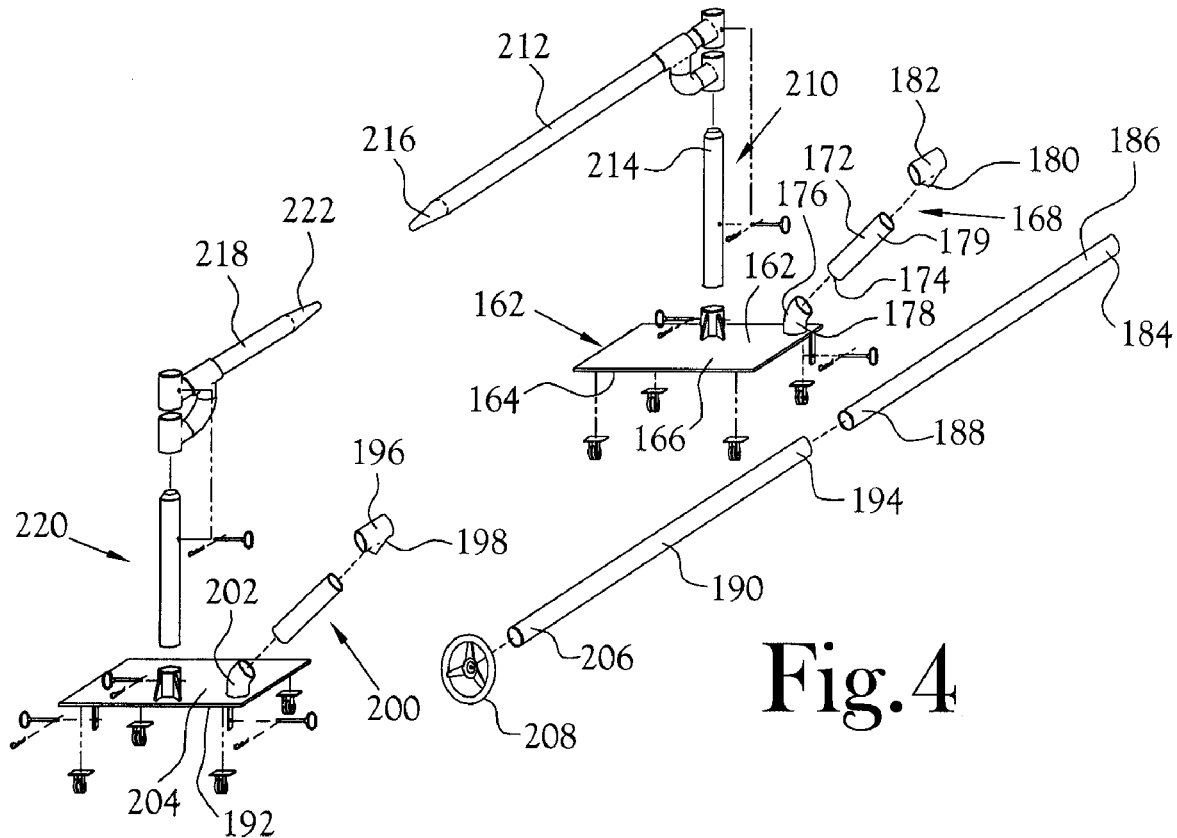
FIG. 4 is an exploded view of several demountable components of one embodiment of various subassemblies of the apparatus of the present invention associated with the most outboard one of the extended rail sets of an apparatus of the present invention.
Figure 5:
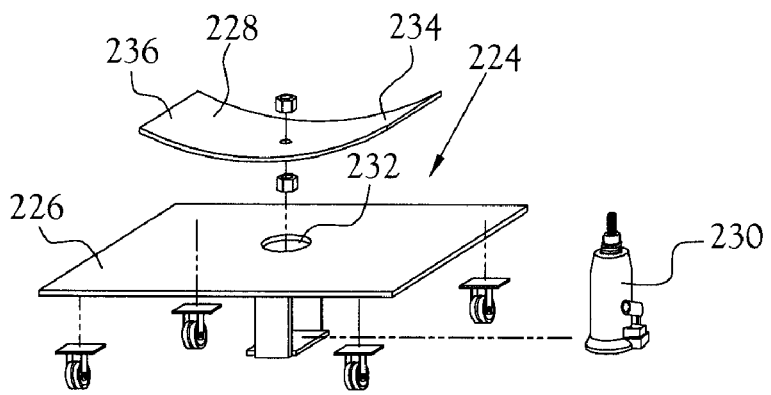
FIG. 5 is an exploded view of one embodiment of a central, rail mounted, support for a bulk roll of carpet mounted on the most outboard one of the extended rail sets of an apparatus of the present invention.

As seen in FIG. 3, in the depicted embodiment, the second rail set also comprises first and second rails 68, 70 defined by first and second "C" channels 72, 74 which are substantially the same cross-sectional dimensions as the "C" channels of the first rail set. In the depicted embodiment, there are provided cross member braces 76, 78 extending between each of the respective opposite ends 89, 82 and 64, 86 of the first and second "C" channels 20, 29 for purposes of rigidity and constancy of lateral spacing of the rails of the second set. Importantly, the first and second "C", channels are coplanar, extend parallel with one another and are plumb with respect to one another and with respect to the "C" channels of the first rail set. In one example, the first and second "C" channels of the second rail set are spaced apart from one another by a distance of thirty-one and one half inches outside to outside.

For purposes of providing telescopic movement of the second rail set with respect to the first rail set, the openings of the first and second "C" channels 34, 36 of the first rail set face one another to define bearing raceways 58, 60 along the length of each of the first and second rails of the first rail set for receipt therein of roller bearings 62 of the second rail set.

On the outside surface 88, 89 of the webs 92, 94 of each of the first and second "C" channels 72, 74 of the second rail set there is mounted a plurality of roller bearings 62 at spaced apart locations along the length of such first and second "C" channels of the second rail set. These roller bearings project outwardly from the outside surface of the web of the "C" channels of the second rail set and are operatively received within respective ones of the bearing raceways 58, 60 defined by the first and second "C" channels of the first rail set thereby providing for precise and repetitive telescopic movement of the second rail set with the first rail set.

For purposes of providing telescopic movement of the third rail set 16 with respect to the second rail set 14, the openings 96, 98 of the first and second "C" channels of the second rail set face one another to define bearing raceways 100, 102 along the length of the rails of the second rail set for receipt therein roller bearings 62' (typical) associated with the third rail set.

As seen if FIG. 3, in the depicted embodiment, the third rail set 16 also comprises first and second "C" channels 104, 106 which are substantially the same cross-sectional dimensions as the "C" channels of the first and second rail sets and which define the first and second rails 120, 122 of the third rail set. In the depicted embodiment, there are provided cross member braces 108, 110 extending between each of the respective opposite ends of the first and second "C" channels of the third rail set for purposes of rigidity and constancy of lateral separation of the first and second rails of the third rail set. Importantly, the first and second "C" channels of the third rail set are coplanar, extend parallel with one another and are plumb with respect to one another and with respect to the "C" channels of the first and second rail sets. In one example, the first and second "C" channels of the third rail set are spaced apart from one another by a distance of twenty-seven and one half inches outside to outside.

As with the rails 124, 136 of the second rail set, each of the web portions of each of the first and second "C" channels of the third rail set is provided with a plurality of roller bearings 62' with are receivable respective ones of the bearing raceways 98, 100 defined within the facing "C" channels of the second rail set. In a typical example, each of the rails of the third rail set are also about ten feet in length so that substantially the entire length of the third rail set is telescopically receivable within the first and second rail sets.

On the outside surfaces 128, 130 of the webs 124, 126 of each of the first and second "C" channels of the third rail set, there are mounted a plurality of roller bearings 62' at spaced apart locations along the length of such first and second "C" channels of the third rail set. These roller bearings project outwardly from the outside surface of the web of the "C" channels of the third rail set and are operatively received within respective ones of the bearing raceways of the first and second "C" channels of the second rail set thereby providing for precise and repetitive telescopic movement of the third rail set with respect to the second rail set.

Figure 6:
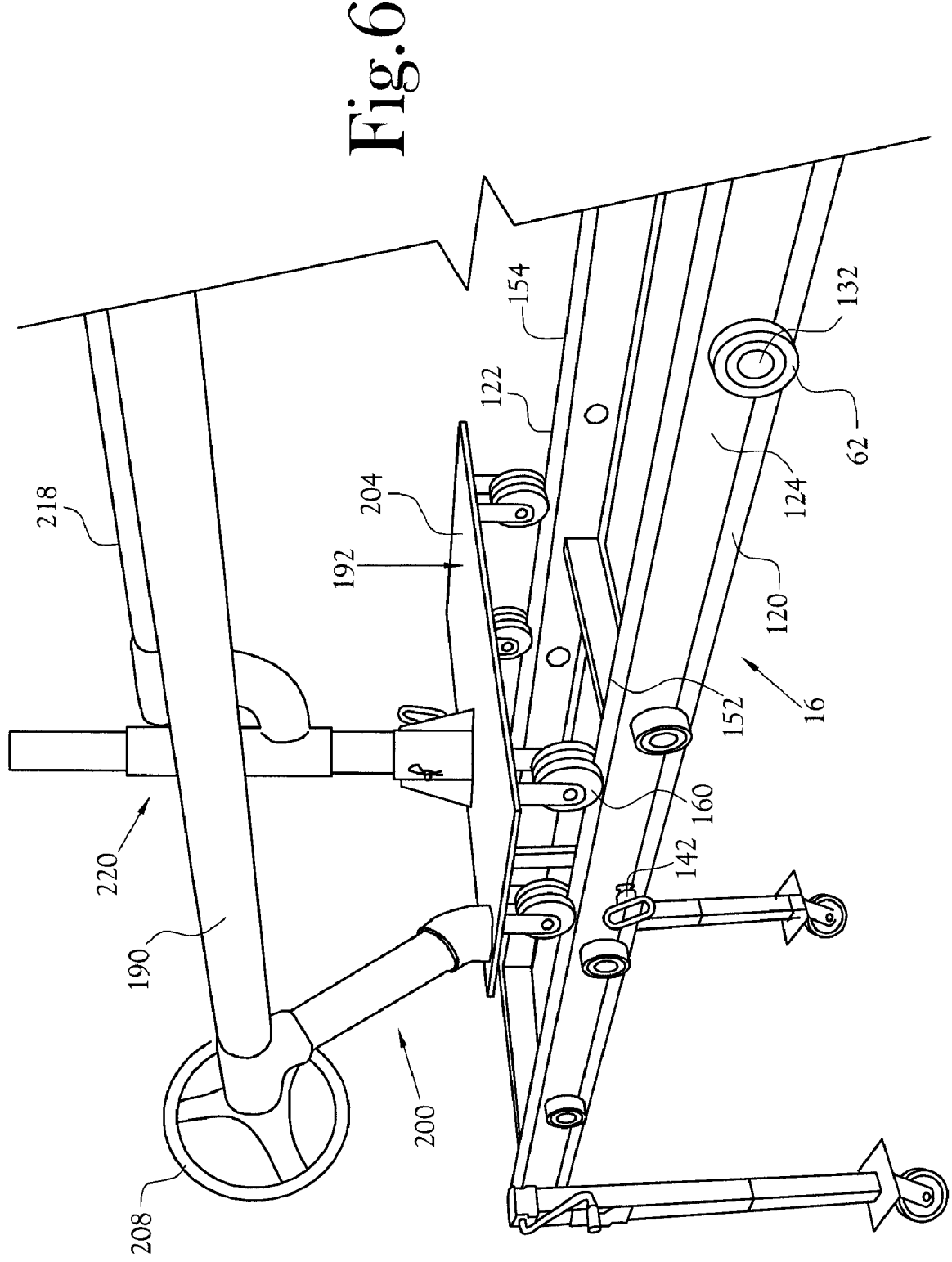
FIG. 6 is a representation of a portion of the outboard end of the most outboard one of the triple rail sets of an apparatus of the present invention.
Figure 7:
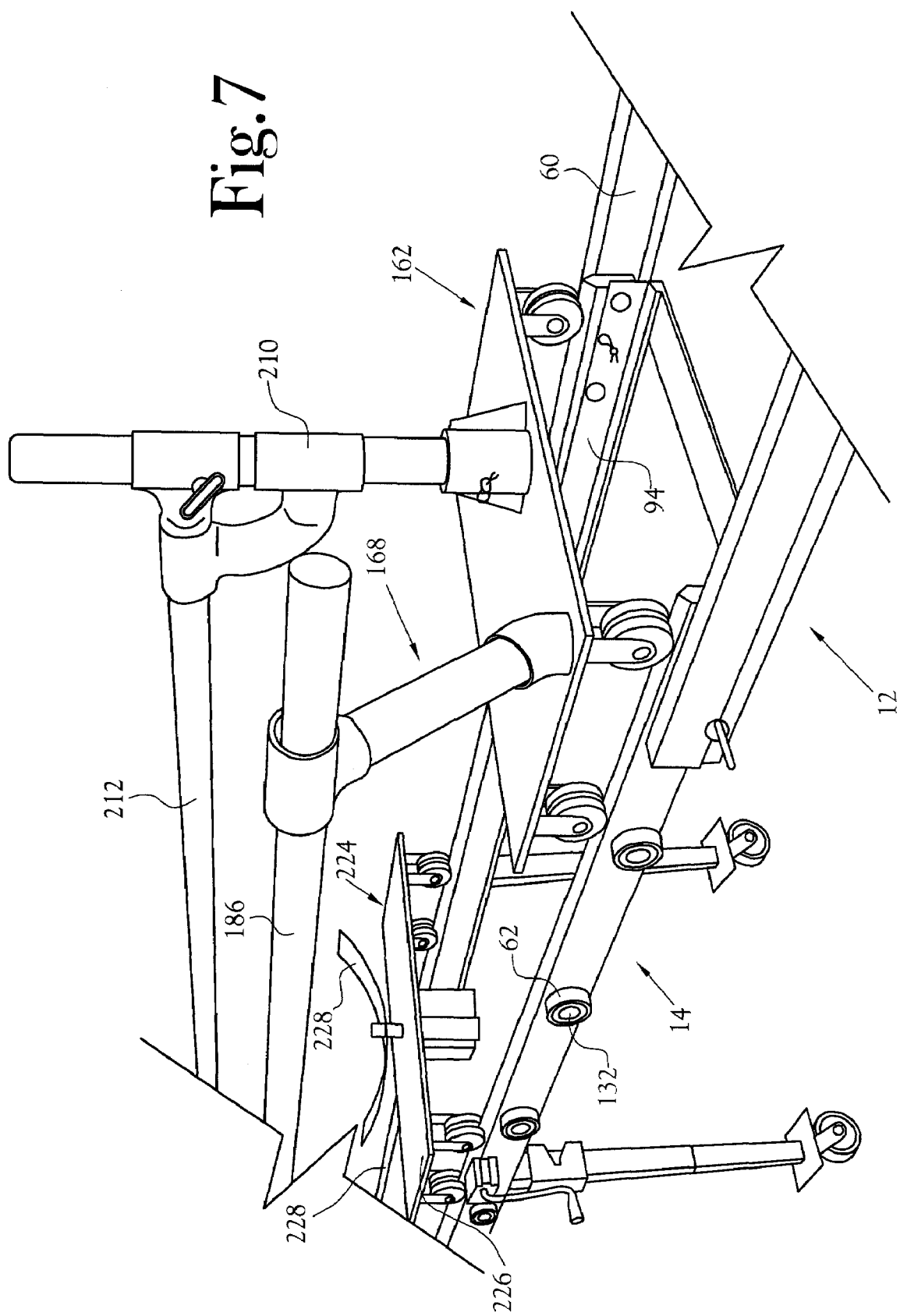
FIG. 7 is a representation of a portion of the inboard end of an apparatus of the present invention in its extended attitude.

In the depicted embodiment, each of the roller bearings is journaled on a stub shaft 132 which projects laterally from a respective web portion of each of the first and second rails of each of the second and third rail sets (See FIG. 6. In one example, each roller bearing is thus oriented in a vertical plane, with all of the roller bearings on a web of a given rail of a given rail set web being coplanar. As noted the lateral spacing between the first and second rails of the second rail set is about four inches less than the lateral spacing between the first and second rails of the first rail set. Further, the lateral spacing between the first and second rails of the third rail set is about 4.5 inches less than the lateral spacing between the first and second rails of the second rail set. By this means, the third rail set is telescopically receivable between the rails of the second rail set and the second rail set is receivable between the rails of the first rail set. In one example, the vertical clearance between the roller bearings and the vertical height of a respective raceway is about 0.0625 inch, thereby ensuring that when the three rail sets are telescopically fully received within one another the three rails sets occupy a common plane. By reason of the precise dimensioning of the components of the three rail sets, this commonality of planar orientation of the three rail sets is maintained even when the rail sets are each fully telescopically extended with respect to each other.

Maintenance of the coplanar orientation of the three rails sets is further ensured by means of one or more jacks 134,136 mounted on and adjacent the outboard ends 84, 86 of each of the first and second rails of the second rail set. Like jacks 138, 140 are mounted on and adjacent the outboard ends of the first and second rails of the third rail set. Each jack is demountable for purposes of telescopic retraction of the third rail set into the second rail set and retraction of the combined second and third rail sets into the first rail set. As desired, each jack may be provided with an omnidirectional wheel 141 as an aide in sliding movement of the second and third rail sets between their telescoped and extended positions. Demountability of each jack may be provided by means of at least two spaced apart bolts, for example (not shown), which extend through respective throughbores of each jack and through registering throughbores through a respective rail and with suitable locking nuts applied to the distal ends of such bolts or other suitable pinning and/or locking device as is known in the art.

In a preferred embodiment, further safety pins 142 (typical) are inserted through registering throughbores of each jack and both of the rails of the adjacent telescoping rails of the second and third rail sets when the second and third rail sets are extended with respect to the first rail set and with respect to one another. These same safety pins may be employed to retain the multiple rail sets in their contracted telescopic relationship, as desired. Preferably, for safety reasons, these safety pins are color coded with a paint which strongly contrasts with the color of the rails of the multiple rail sets.

Figure 8:
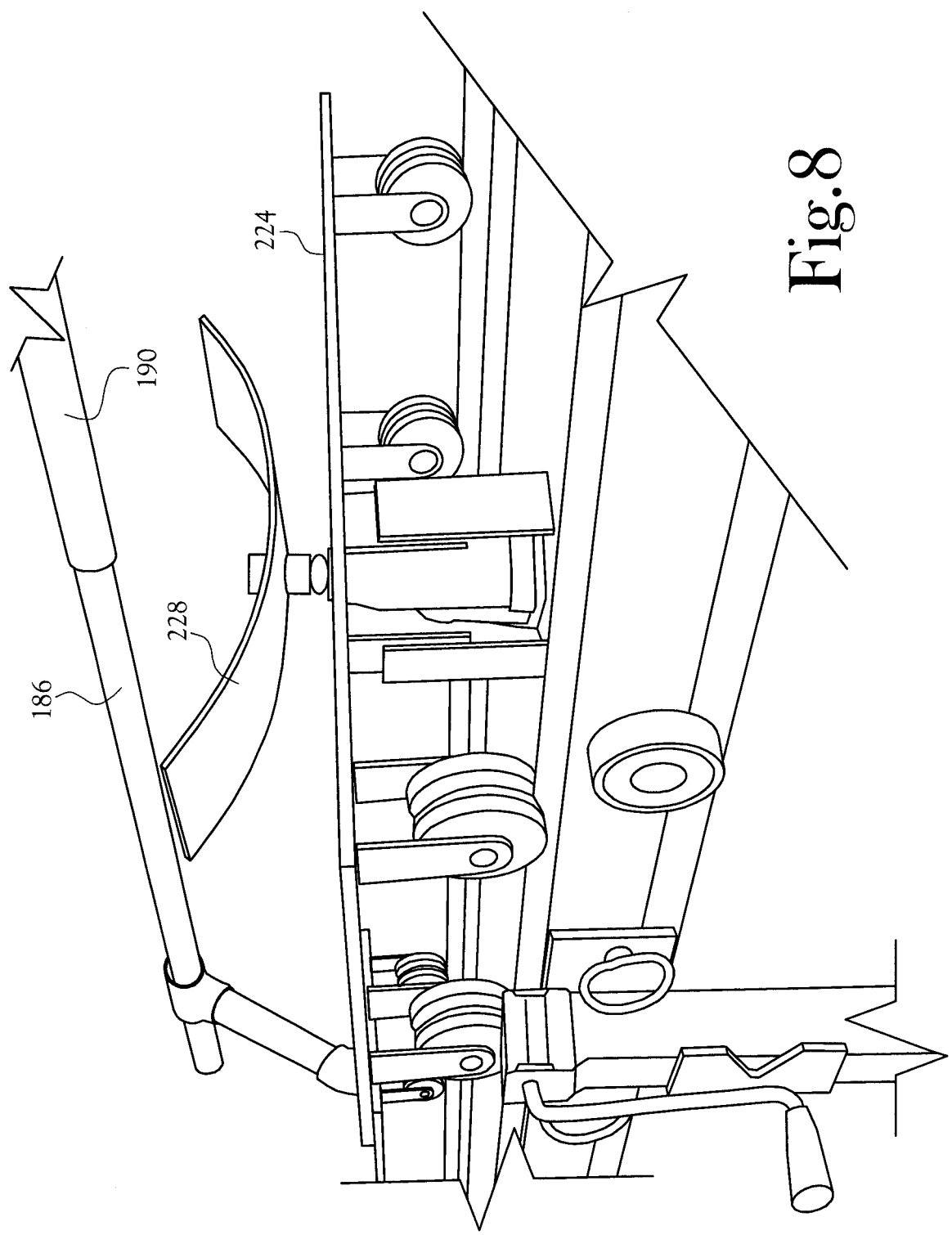
FIG. 8 is a detail view of one embodiment of a track mounted central support of a bulk roll of carpet mounted on the most outboard rail set of an apparatus of the present invention and depicting details of roller supports for the telescoping rail sets and roller supports for the central support for a bulk roll of carpet mounted on the apparatus of the present invention; and, FIG. 9 is a schematic representation of a portion of a bulk roll of carpet and a severed collected portion of such carpet.
Figure 9:
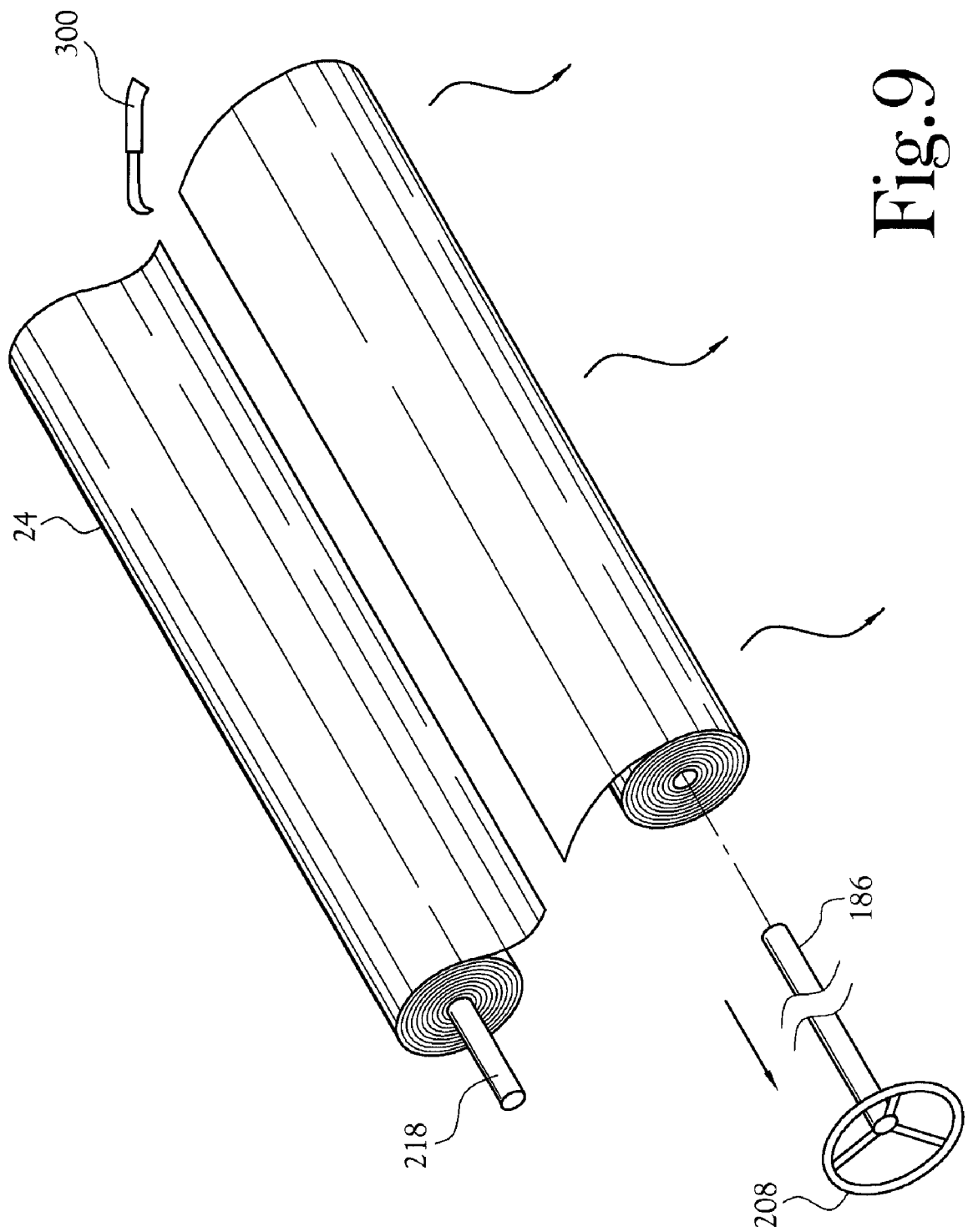

With reference to FIGS. 2,3 and 6, as depicted, there is fixedly mounted on the top leg 144,146 of each of the first and second rails of the second rail set, individual inverted "v" rails 148,150 that extend along the length of their respective rail. Like inverted "v" rails 152, 154 mounted on the top legs 156,158 of each of the first and second rails of the third rail set. Each such inverted "v" rail is adapted to receive thereon the circumferentially "v" notched wheels 160 (typical) (See FIG. 8) of one or more dollies for reciprocating movement of the dollies along the length of respective ones of the second and third rail sets.

In particular, in accordance with one aspect of the present invention, a first carpet roll supporting means is provided by a first demountable dolly which is mounted for reciprocating movement along the length of the second rail set by means of circumferentially "v" grooved wheels which ride along the inverted "v" rails mounted on the top of each of the first and second rails of the second rail set. Removably mounted on the top surface of the first dolly is a third upright standard 210 which serves to removably mount a first probe 212 which extends in cantilevered fashion from the upper end 214 of the standard in a direction along the length of the present apparatus. The distal end of the probe is tapered, i.e., generally conical in geometry, so as to be readily insertable into the center of a bulk roll of carpet for loading a bulk roll of carpet onto the present apparatus and support of such bulk roll while allowing for the rotation of the bulk roll about the probe on the course of unrolling portions of the carpet from the bulk roll. Further support for the bulk roll is provided at its opposite end as by a second probe 218 which is removably mounted in a fourth upright standard 220 which is itself removably mounted on the top surface 204 of a second dolly 192. In one example, the first probe is about nine feet in cantilevered length and the second probe is about three feet in cantilevered length. Like the first probe, the distal end 222 of the second probe os tapered to enhance the entry of this second probe into the center of the bulk roll of carpet.

A second carpet roll supporting means for the bulk roll of carpet includes a second dolly rollably mounted on the inverted "v" rails that are mounted on the top surface of the first and second rails of the second rail set hence is movable along substantially the entire length of the second rail set.

Collection and support for respective portions of the carpet originally disposed on the bulk roll is provided by means of standard 168 which extends upwardly from the top surface 166 and obliquely laterally away from the general centerline 170 of the top surface of the first dolly. This standard may take the form of a polymeric tube 172, one end 174 of which is removably recived within a 45-degree polymeric elbow 176 which, in turn, is affixed at one of its ends 178 to the top surface of the dolly. On the outboard end of the standard 168 there is provided a tee 180 which also is removable from the standard as desired, The cross leg 182 of the tee is oriented horizontally and slidably receives therethrough an inboard end 104 of the first polymeric rollup tube 186 which is adapted to receive a portion of carpet rolled thereupon. The opposite end 188 of the first tube 186 is slidably received whithin a second polymeric rollup tube 100 which extends from the first tube to an outboard (second) dolly 192. The inboard end 194 of this second tube is rotatably and slidably received with the cross leg 196 of a further tee 198 which, in turn is mounted on a second standard 200 that is removably mounted in a 45-degree elbow 202 affixed to the top surface 204 of the second dolly 192 and extends upwardly and obliquely outwardly from the top surface of the second dolly. The first and second tubes may rotate together, as by a frictional fit therebetween, but are slidable with respect to one another to permit selection of the overall length of the first and second tubes. Thus, this standard is removable from the dolly when not in use.

The outboard end 206 of the telescoping first and second tubes is further rotatably supported by a standard 200 mounted to the top surface of the second dolly as by a 45 degree polymeric pipe elbow, a standard 200 which extends upwardly and outwardly from the surface of the second dolly. A tee 196 is fitted onto the outboard distal end of the standard 200 and the outboard end 206 of the second tube is rotatably passed through the leg of the tee.

There is fitted a wheel 208 on the outboard end 206 of the first tube that is mounted on the first dolly, such wheel being pinned to the first tube so that rotation of the wheel effects rotation of the first and second tubes, substantially simultaneously. As noted, the first tube is inserted into the second tube thereby providing for selection of the overall effective length of the two combined tubes by moving the first and second dollies toward or away from one another. This feature is of importance when unrolling portions of carpet from bulk rolls of various width carpet, thereby adding significant versatility to the present apparatus.

It will be noted that the first and second dollies are moveable along their respective rails toward and away from one another to select their effective combined overall length. Also, as noted, the first and second tubes are slidably associated at their ends, hence their combined overall length is also selectable as a function of the relative movements of the first and second dollies. Thus, provision is made within the present invention for the mounting and manipulation of bulk rolls of carpet of different widths.

As needed or desired, a third dolly 224 is rollably mounted on the inverted "v" rails on the top surface of the first and second rails of the third rail set at a location intermediate the first and second dollies. This third dolly is provided with a planar platform 226. In this dolly, there is mounted centrally of the platform a support member 228 which is vertically adjusted by means of a bottle jack 230 disposed underneath and extending upward through a central opening 232 through the platform. This bottle jack provides for lifting and lowering of the support member as needed to provide support for a bulk roll of carpet intermediate its opposite ends. In one embodiment, this support member is curved upwardly away from the horizontal at its opposite side portions 234,236 to assist in reduction of lateral bending of a bulk roll of carpet as the bulk roll is being manipulated and/or unrolled in the course of disbursement of portions thereof. Being rollably mounted on the rails of the third rail set, the third dolly may be positioned at substantially any location between the first and second dollies as desired. For example, the third dolly may be initially positioned near the distal end of the first probe as a bulk roll of carpet is fed onto the first probe and then move with the carpet as the carpet is further inserted onto the first probe. Through adjustment of the vertical position of the support member of the third dolly, the support provided by such support member may be selected as needed for a given bulk roll of carpet. In one sense, because the third dolly is movable independent of the movement of the first and/or second dollies, the third dolly may be "self-seeking" with respect to the support offered to a bulk roll of carpet. Further, in one embodiment, one upwardly side portion 234 of the support member may be extended to lie beneath a portion of carpet being collected on the first and second tubes 186,190 which extend between the first and second dollies.

As noted each of the dollies of the present invention, and/or those components supported on the dollies are removable, thereby providing for "break-down" of the apparatus for any of several reasons, such as storage, ease of manual assembly and/or manipulation of the components, etc. It will be recognized, therefore, that various removable pins, safety and otherwise, may be employed in a conventional manner to hold the removable components in place during use of the apparatus and for releasing such components as desired.

In one embodiment of the method of the present invention, the first rail set is anchored in a vehicle with the second and third rail sets are telescopically mounted on the first rail set. Various of the components of the apparatus are removed from the rail sets, including the dollies, as needed, for ease of temporary transport or storage of the apparatus. In preparation for the loading of a bulk roll of carpet onto the apparatus, the second rail set (carrying the third rail set therewith) is extended, aligned and stabilized. Next, the third rail set is moved toward its extended attitude, accompanied by careful adjustment of the relative vertical planes and length alignments of the second third rail sets with respect to the vertical plane and length dimension of the first rail set, through the application and manipulation of the jacks and their respective height selections. Once the rail sets are extended, aligned and stabilized, the dollies and their accompanying components are mounted onto their respective supporting rails. Thereupon, commonly using a forklift or like mechanical lifting apparatus, a bulk roll of carpet is loaded onto the first probe, followed by insertion of the second probe on the distal end of the bulk roll of carpet, thereby providing support for both ends of the bulk roll of carpet. As needed or desired, the third dolly is positioned under the bulk roll of carpet in supporting position of the central portion of the bulk roll of carpet intermediate the first and second dollies.

Once a bulk roll of carpet has been fully loaded onto the probes, the loose end of the roll of carpet is manually drawn over and about the first and second collection tubes. Employing the number of turns of the wheel which drives the first and second tubes, a desired length of carpet may be measured and unrolled from the bulk roll and collected on the collection tubes. This portion of carpet is then severed, as by means of a carpet-cutting knife 300 known in the art, from the roll. Once severed, the collected portion of the carpet is removed from the apparatus by pulling horizontally on the wheel to withdraw the first and second tubes from the interior of the collected rolled portion of the carpet and carried manually to its place of installation.

What is claimed:

1. Apparatus for storing a bulk roll of carpet and for dispensing portions of the same from the bulk roll comprising, a first rail set including first and second elongated rails, a portable platform adapted to receive said first rail set thereon, means anchoring said first and second rails of said first rail set on said platform in side-by-side mutually parallel relationship to one another and plumb with respect to said platform, said first and second rails of said first rail set being spaced apart from one another by a first distance which is constant along the entire length of said first and second rails of said first rail set, each of said first and second rails defining a respective bearing raceway, said raceways facing one another, a second rail set including first and second rails which are disposed in side-by-side mutually parallel relationship to one another and plumb with respect to said platform, said first and second rails of said second rail set being spaced apart from one another by a second distance which is constant along the entire length of said first and second rails of said second rail set and which is of a lesser value than said first distance separating said first and second rails of said first rail set, whereby said second rail set is received between said first and second rails of said first rail set and in a plane common to the plane of said first rail set, each of said first and second rails of said first rail set defining a bearing raceway, said raceways facing one another, each of said first and second rails of said first rail set including an outboard web, a first plurality of bearing members affixed to said outboard web of each of said first and second rails of said second rail set and projecting therefrom to be supportingly received by respective ones of said raceways defined by said first and second rails of said first rail set, whereby said second rail set is telescopically mounted within said first rail set, a third rail set including first and second elongated rails which are disposed in side-by-side mutually parallel relationship to one another and plumb with respect to said platform and in a plane common to the plane of said first and second rail sets, said first and second rails of said third rail set being spaced apart from one another by a third distance which is of lesser value that said second distance separating said first and second rails of said second rail set, whereby said third rail set is received between said first and second rails of said second rail set, each of said first and second rails of said third rail set having an outboard web and defining a bearing raceway, said raceways facing one another, a second plurality of bearing members affixed to said outboard web of each of said first and second rails of said third rail set and projecting therefrom to be supportingly received in respective ones of said raceways defined by said first and second rails of said second rail set whereby said third rail set is telescopically mounted within said second rail set, third and fourth rails fixedly mounted atop each of said first and second rails of said second rail set and extending substantially along the length of respective ones of said first and second rails of said second rail set, each of said third and fourth rails being adapted to define supports for the movement of one or more dollies back and forth along the length of said third and fourth rails, third and fourth rails fixedly mounted atop each of said first and second rails of said third rail set and extending substantially along the length of respective ones of said first and second rails of said third rail set, each of said third and fourth rails being adapted to define supports for the movement of one or more dollies back and forth along the length of said third and fourth rails, a first dolly including a generally planar top surface and a bottom surface, a plurality of wheel members supportingly mounted on said bottom surface of said first dolly, said wheel members being disposed at least adjacent respective opposite corners of said first dolly and being received in rotational relationship on respective ones of said third and fourth rails of said second rail set whereby said first dolly is positionable along the length of said second rails set, a second dolly including a top surface and a bottom surface, a plurality of wheel members mounted on said bottom surface thereof, said wheel members being disposed at least adjacent respective opposite respective opposite corners of said second dolly and being received in rotational relationship on respective ones of said third and fourth rails of said third rail set whereby said second dolly is positionable along the length of said third rail set, a third dolly including a top surface and a bottom surface, dolly including a top surface and a bottom surface, a plurality of wheel members mounted on said bottom surface thereof, said wheel members being disposed at least adjacent respective opposite respective opposite corners of said second dolly and being received in rotational relationship on respective ones of said third and fourth rails of said third rail set whereby said second dolly is positionable along the length of said third rail set, said second dolly being further disposed intermediate said first and third dollies, first carpet roll supporting means associated with said first dolly and including a third upright standard extending upwardly from said top surface of said first dolly and a first probe extending laterally from said standard in cantilevered fashion over and in alignment with said third rail set, said probe being adapted to be inserted into a first end of the bulk roll of carpet for lifting and support of said bulk roll in a cantilevered position over said third rail set, second carpet roll supporting means associated with said second dolly and including a fourth upright standard extending upwardly from said top surface of said second carriage and a second probe extending from said fourth upright standard in cantilevered fashion over and in alignment with said third rail set, said second probe facing and in alignment with said first probe and being adapted to be inserted into a second end of the bulk roll of carpet, a first standard extending obliquely upwardly from said top surface of said first dolly and directionally away from said third upright standard, a second standard extending obliquely upwardly from said top surface of said second dolly and directionally away from said fourth standard, and at least one elongated carpet collection and support extending between said first and second standards, said at least support being spaced laterally apart from and parallel to said aligned first and second probes and thereby in position to receive carpet unrolled from the bulk roll of carpet disposed on said probes.

2. The apparatus of claim 1 and including carpet support means mounted on said third dolly and being height adjustable above said third dolly and above the plane occupied by said third rail set.

3. The apparatus of claim 1 and including legs mounted on said first and second rails of each of said first and second rail sets in position to support said first and second rail sets in coplanar relationship with one another and said first rail set upon said first and second rail sets when said first and second rails sets are telescopically withdrawn from said first rail set.

4. The apparatus of claim 3 wherein each of said legs is of adjustable length.

5. The apparatus of claim 4 wherein each of said legs is demountable from its respective rail.

6. The apparatus of claim 1 wherein said at least one elongated carpet collection and support means comprises at least one tubular member which is rotatable within said first and second standards and including a driving wheel associated with one end of said tubular member and adapted to rotate said tubular member for the collection of carpet thereon in a roll form.

7. The apparatus of claim 6 wherein rotation of said at least one carpet collection and support comprises first and second tubular members which are telescopically disposed with respect to one another.

8. The apparatus of claim 7 wherein each 360 degrees of rotation of said at least one carpet collection and support effects the withdrawal from said bulk roll of carpet a length of carpet which is a function of the circumference of said telescoping tubular members.

9. The apparatus of claim 7 wherein said at least one carpet collection and support is slidable within said third and fourth standards whereby said at least one carpet collection and support may be withdrawn laterally from a portion of carpet collected thereon to permit manual withdrawal of a collected portion of carpet therefrom.

10. The apparatus of claim 1 and including a curved plate mounted on the top surface of said third dolly, said curve conforming generally to the circumferential curvature of said bulk roll and any carpet collected on said at least one carpet collection and support and including means for adjusting the height of said plate above said top surface of said second dolly.

11. The apparatus of claim 1 wherein each of said standards and each of said dollies is demountable from its respective rail set.

12. A method for storing and dispensing carpet from a bulk roll of said carpet comprising the steps of providing a plurality of rail sets, each rail set including a dolly mounted thereon for movement along the length of its respective one of said rails sets, mounting said plurality of rail sets for telescopic movement of said rail sets with respect to one another, mounting a bulk roll of carpet on a first one of said dollies in a cantilevered fashion and extending over and along a respective one of said rail sets, mounting at least one elongated carpet collection and support laterally spaced apart from and parallel with said cantilevered bulk roll of carpet and having a longitudinal centerline, securing an end of said bulk roll of carpet to said at least one support, rotating said at least one carpet collection and support about its longitudinal centerline to withdraw carpet from said bulk roll and collect the same on said at least one support, severing said portion of carpet collected on said at least one carpet collection and support from said bulk roll, and withdrawing said at least one carpet collection and support from said collected portion of carpet.

13. The method of claim 12 and including the step of positioning third dolly along its respective supporting rail set in supporting relationship to an end of said bulk roll of carpet distant from said first dolly.

14. The method of claim 13 and including the further step of providing elongated probes on each of said first and second dollies, each probe extending in cantilevered fashion from its respective standard and in facing relationship to one another whereby said probes are adapted to be inserted into opposite ends of a bulk roll of carpet disposed therebetween.

15. The method of claim 14 and including the further step of mounting a vertically adjustable support member on said third dolly and extending laterally underneath said bulk roll of carpet to provide vertical support for one end of said bulk roll of carpet as said bulk roll of carpet is initially loaded onto said probes and thereafter at any one of a plurality of selectable positions underneath said bulk roll of carpet by movement of said third dolly along the length of said further rail set.

16. The method of claim 15 and including the further step of positioning said adjustable support member associated with said third dolly in position to provide vertical support for both said bulk roll of carpet and for carpet collected on said at least one carpet collection and support.

* * * * *